(12) United States Patent
Huhtasalo et al.

(10) Patent No.: US 11,981,481 B2
(45) Date of Patent: May 14, 2024

(54) METAL CONTAINER COMPRISING A UHF RFID TAG

(71) Applicant: Digital Tags Finland, OY, Tampere (FI)

(72) Inventors: Lauri Huhtasalo, Tampere (FI); Elham Moradi, Tampere (FI)

(73) Assignee: Digital Tags Finland, OY, Tampere (FI)

( * ) Notice: Subject to any disclaimer, the term of this patent is extended or adjusted under 35 U.S.C. 154(b) by 629 days.

(21) Appl. No.: 17/257,382

(22) PCT Filed: Jul. 2, 2019

(86) PCT No.: PCT/IB2019/055614
§ 371 (c)(1),
(2) Date: Dec. 31, 2020

(87) PCT Pub. No.: WO2020/008342
PCT Pub. Date: Jan. 9, 2020

(65) Prior Publication Data
US 2021/0269205 A1    Sep. 2, 2021

(30) Foreign Application Priority Data
Jul. 2, 2018 (SE) .................... 1850828-3

(51) Int. Cl.
*B65D 51/24* (2006.01)
*G06K 19/07* (2006.01)
(Continued)

(52) U.S. Cl.
CPC ....... *B65D 51/245* (2013.01); *G06K 19/0723* (2013.01); *G06K 19/07786* (2013.01);
(Continued)

(58) Field of Classification Search
CPC .. B65D 51/245; B65D 17/02; G06K 19/0723; G06K 19/07786; G06K 19/0779; H01Q 1/2225; H01Q 9/285
(Continued)

(56) References Cited

U.S. PATENT DOCUMENTS 5,947,256 A    9/1999 Patterson
6,226,619 B1 *  5/2001 Halperin .......... G06K 19/07758
                                                705/23
(Continued)

FOREIGN PATENT DOCUMENTS

EP    1308883 A1    5/2003
JP    2006232292 A    9/2006
(Continued)

OTHER PUBLICATIONS

International Search Report from corresponding PCT application No. PCT/IB/2019/055614 dated Aug. 13, 2019.

*Primary Examiner* — Zhen Y Wu
(74) *Attorney, Agent, or Firm* — Greer, Burns & Crain, Ltd.

(57) ABSTRACT

A substantially cylindrical, metal container (1) which container comprising an envelope surface wall (2), a top end and a bottom end (3), wherein the bottom end having a cavity which is formed by a circular concave, parabolic bottom surface (4) and a circular surrounding edge (5). A UHF RFID tag (6), comprising an integrated circuit (7) and an antenna (8), is arranged at the bottom end, wherein the antenna is located at a predetermined distance above the center of the bottom surface (4), such that the bottom surface reflects the antenna radiation.

14 Claims, 2 Drawing Sheets

Figure 1:
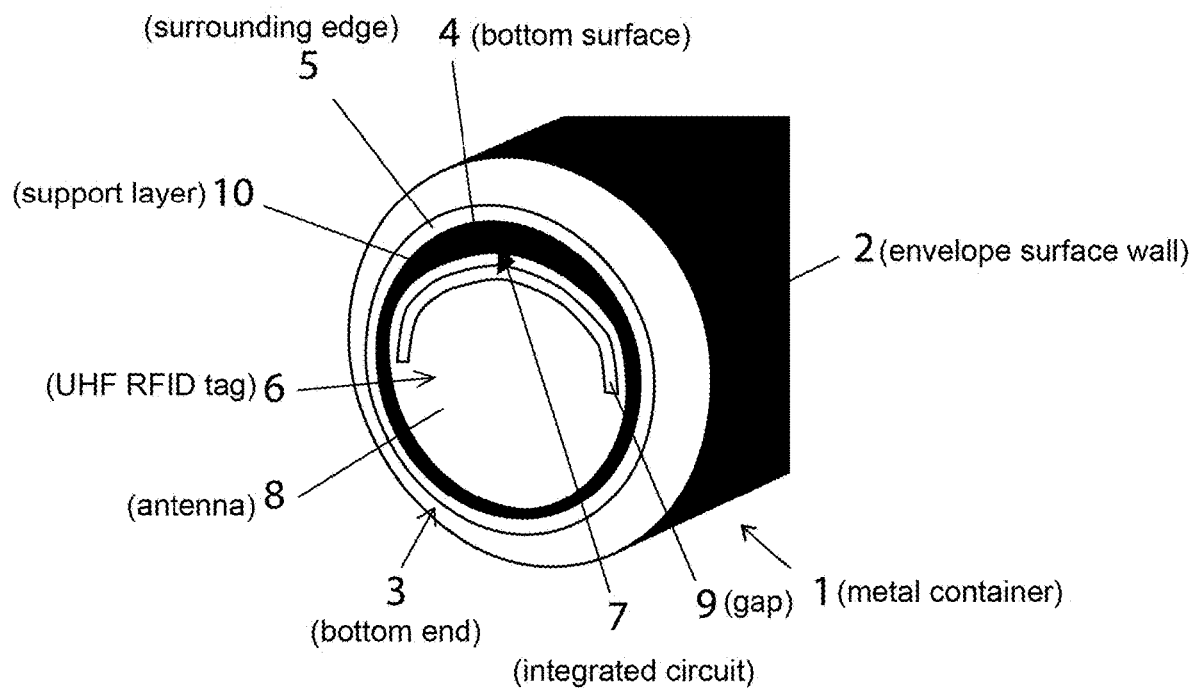

(51) Int. Cl.
    *G06K 19/077* (2006.01)
    *H01Q 1/22* (2006.01)
    *H01Q 9/28* (2006.01)
    *B65D 17/00* (2006.01)
(52) U.S. Cl.
    CPC ....... *G06K 19/0779* (2013.01); *H01Q 1/2225* (2013.01); *H01Q 9/285* (2013.01); *B65D 17/02* (2013.01)
(58) Field of Classification Search
    USPC ..................................................... 340/572.1
    See application file for complete search history.

(56) References Cited

U.S. PATENT DOCUMENTS

| | | | | |
|---|---|---|---|---|
| 7,088,249 | B2* | 8/2006 | Senba | H01Q 1/42 343/788 |
| 7,617,850 | B1 | 11/2009 | Dorney | |
| 7,961,103 | B2* | 6/2011 | Andrenko | G06K 19/041 340/572.1 |
| 8,807,438 | B2* | 8/2014 | Kikuchi | H01Q 15/00 340/572.1 |
| 9,487,327 | B2 | 11/2016 | Schmid | |
| 10,360,822 | B2* | 7/2019 | Versluys | G09F 3/03 |
| 2002/0177408 | A1 | 11/2002 | Forster et al. | |
| 2003/0095253 | A1 | 5/2003 | Chow | |
| 2003/0112912 | A1 | 6/2003 | King et al. | |
| 2004/0052034 | A1* | 3/2004 | Senba | H01Q 1/2225 361/600 |
| 2004/0074974 | A1* | 4/2004 | Senba | G06K 19/07728 343/866 |
| 2006/0022056 | A1 | 2/2006 | Sakama | G06K 19/07771 235/492 |
| 2006/0086808 | A1* | 4/2006 | Appalucci | B65D 25/205 235/492 |
| 2007/0075861 | A1* | 4/2007 | Cook | G06K 19/07749 340/572.1 |
| 2007/0103312 | A1* | 5/2007 | Watanabe | H01Q 1/2208 340/572.3 |
| 2007/0252706 | A1* | 11/2007 | Furutani | G06K 7/10178 257/679 |
| 2008/0018479 | A1* | 1/2008 | Hashimoto | G06K 19/07771 340/572.7 |
| 2008/0252462 | A1* | 10/2008 | Sakama | G06K 19/07749 340/572.7 |
| 2009/0091455 | A1* | 4/2009 | Baba | G06K 19/07771 340/572.7 |
| 2009/0231098 | A1 | 9/2009 | Chisholm | |
| 2009/0242446 | A1* | 10/2009 | Abbott | B65D 25/205 206/459.5 |
| 2010/0007501 | A1* | 1/2010 | Yang | B01L 3/5453 340/572.8 |
| 2010/0181379 | A1* | 7/2010 | Okegawa | G06K 19/07749 235/492 |
| 2010/0219252 | A1* | 9/2010 | Kikuchi | H01Q 15/00 235/488 |
| 2011/0050426 | A1* | 3/2011 | Choong | G06K 19/07771 340/572.1 |
| 2011/0063786 | A1* | 3/2011 | Kikuchi | G06K 19/07749 361/679.01 |
| 2011/0102150 | A1* | 5/2011 | Sotobayashi | G06K 19/07771 340/10.1 |
| 2011/0114647 | A1* | 5/2011 | Hallberg | B65D 41/04 220/592.2 |
| 2014/0361090 | A1* | 12/2014 | Baba | G06K 19/07758 29/601 |
| 2016/0039564 | A1* | 2/2016 | Schmid | B65D 17/4012 220/215 |
| 2016/0224878 | A1* | 8/2016 | Hull | B32B 37/223 |
| 2016/0342821 | A1* | 11/2016 | Nyalamadugu | G06K 7/10346 |
| 2017/0365909 | A1* | 12/2017 | Wu | H01Q 1/38 |
| 2018/0255949 | A1* | 9/2018 | Fritz | A47G 19/2261 |
| 2021/0034939 | A1* | 2/2021 | Ueki | G06K 19/0723 |

FOREIGN PATENT DOCUMENTS

| | | |
|---|---|---|
| JP | 2014114066 A | 6/2014 |
| JP | 2017039511 A | 2/2017 |
| RU | 2645655 C2 | 4/2017 |
| WO | 2006048950 A1 | 5/2006 |
| WO | 2011130519 A2 | 10/2011 |
| WO | 2018056363 A1 | 3/2018 |

* cited by examiner

METAL CONTAINER COMPRISING A UHF RFID TAG

This application is a U.S. National Phase under 35 U.S.C. § 371 of International Application No. PCT/IB2019/055614 filed Jul. 2, 2019, which claims priority under 35 U.S.C. §§ 119 and 365 to Swedish Application No. 1850828-3, filed Jul. 2, 2018.

TECHNICAL FIELD

In accordance with the preamble of claim 1, the present invention relates to a substantially cylindrical, metal container which container comprising an envelope surface wall, a top end and a bottom end, wherein the bottom end having a cavity which is formed by a circular concave, parabolic bottom surface and a circular surrounding edge.

In the following of the application, the term RFID (Radio Frequency Identification) tag will be frequently used. An RFID tag contains at least two parts: an IC (integrated circuit) that stores and processes information and that modulates and demodulates radio-frequency (RF) signals and an antenna for receiving and transmitting the signal. The tag information is stored in a non-volatile memory. The RFID tag includes either fixed or programmable logic for processing the transmission and sensor data, respectively. The RFID tags in this context are UHF (Ultra High Frequency) RFID tags.

BACKGROUND

Problem

It is well known that there are difficulties to tag metallic cylindrical containers with liquids, such as e.g. beverage aluminum cans, with low cost UHF RFID tags. This is due to the fact that the metal container distracts tag antenna as it reflects and absorbs RF waves.

OBJECT OF INVENTION

An object with the present invention is to present a metal container comprising an UHF RFID tag, which solves the above mentioned problems.

SUMMARY OF THE INVENTION

In accordance of the invention and the characterizing portion of claim 1, a UHF RFID tag, comprising an integrated circuit and an antenna, is arranged at the bottom end, wherein the antenna is located at a predetermined distance above the center of the bottom surface, such that the bottom surface reflects the antenna radiation and thereby prolongs the read range of the antenna.

DETAILED DESCRIPTION OF THE INVENTION

In the following the invention will be described more in detail with reference to FIGS. 1 and 2.

FIG. 1 discloses a container comprising a UHF RFID tag in accordance with the invention.

Figure 2:
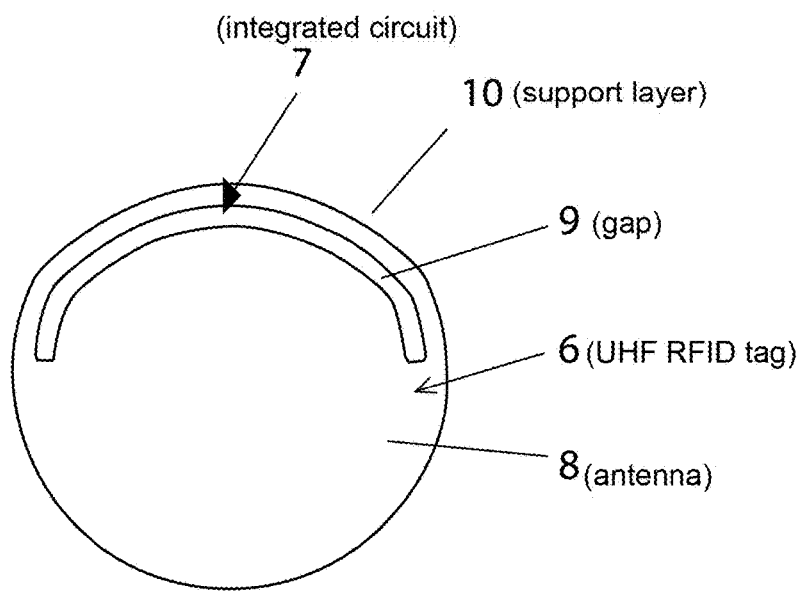

FIG. 2 discloses the UHF RFID tag comprising an integrated circuit and an antenna.

Figure 3:
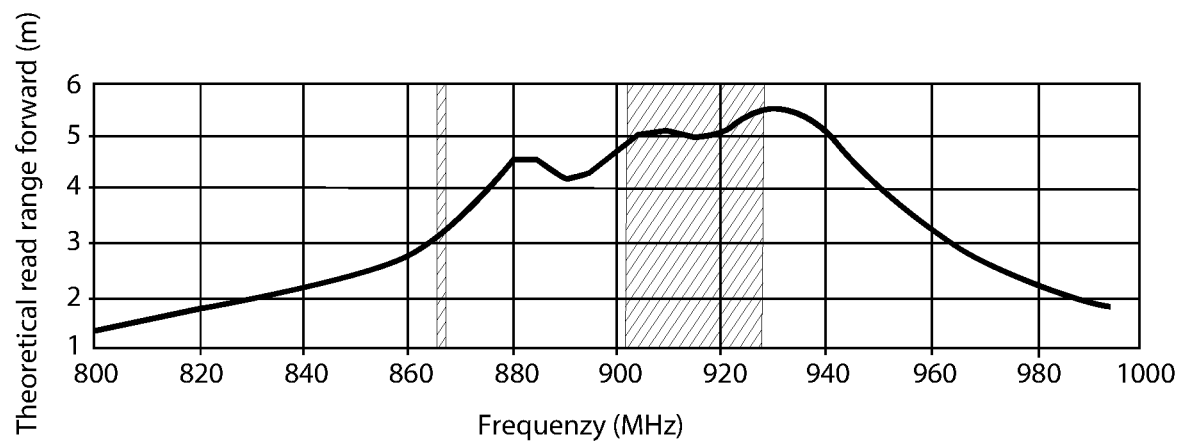

FIG. 3 discloses a diagram of the read range of the UHF RFID tag when it is arranged on the container in accordance with the invention.

FIG. 1 discloses a substantially cylindrical, metal container 1 that may contain liquid, such as e.g. an aluminum beverage can (e.g. a Coca-Cola can). Such beverage cans have normally a volume size of 330 ml or 500 ml. The container 1 comprising an envelope surface wall 2, a top end and a bottom end 3. The bottom end 3 having a cavity which is formed by a circular concave, parabolic bottom surface 4 and a circular surrounding edge 5.

FIG. 1 and FIG. 2 discloses a UHF RFID tag 6 comprising an integrated circuit 7 and an antenna 8 which is attached to the integrated circuit 7. The RFID tag is arranged at the bottom end 3, wherein the antenna is located at a predetermined distance above the center of the bottom surface 4, such that the bottom surface reflects the antenna radiation and thereby prolongs the read range of the antenna.

The antenna 8 is a planar folded dipole antenna and has a planar, substantially circular shape.

The outer diameter of the antenna 8 is close to the diameter of the surrounding edge 5 of the container.

The antenna is located in the range 10-16 mm above the centre of the bottom surface 4, preferably in the range 12-14 mm and most preferred approximately 13 mm.

The UHF RFID tag 6 is attached by glue onto a support layer 10, which support layer is attached on the top of the surrounding edge 5 by glue such that the antenna 8 is located in alignment with the upper end of the surrounding edge 5. The support layer 10 is preferably a PET film, but the skilled person realises that other arrangements or layers may be possible to arrange the antenna at a predetermined distance above the parabolic bottom surface 4, for example paper could also be used instead of the PET film as a support layer.

The outer diameter of the antenna 8 is about the same or smaller than the inner diameter of surrounding edge 5. In case the container 1 is a beverage can, the outer diameter of the antenna 8 is in the range approximately 36-44 mm and preferably about 42 mm.

The circular antenna 8 is preferably made of a thin carrier substrate which is covered with a conductive layer. The skilled person realises that different carrier substrates may be used e.g. polymer, paper, board, textile or non-woven material. Moreover the skilled person realises that different types of conductive layers may be used e.g. aluminium, copper, silver, tin, bismuth or alloys of those. The conductive layer may be applied by etching, jet printing or any other suitable technique to apply a conductive layer.

In a preferred embodiment the carrier substrate is an approximately 50 μm thick PET substrate which is covered with an approximately 10 μm aluminium layer. The PET substrate has a relative permittivity about 3 and a dielectric loss tangent of 0.002.

The antenna has a half ring-shaped gap 9 nearby the outer edge of the antenna, in which gap 9 the carrier substrate is uncovered by the conductive layer. The gap is part of the antenna structure and is used to match antenna impedance to the integrated circuit impedance.

FIG. 3 discloses a test result of the read range of the UHF RFID tag antenna 8 when the antenna is arranged on a beverage can in accordance with the invention. As can be seen from the diagram the read range of the antenna is as much as about three meter at ETSI RFID band (865 MHz-868 MHz) and 5 m at FCC RFID band (902 MHz-928 MHz).

The benefit with the present invention is that the arrangement of the antenna 8, above the parabolic bottom surface 4, prolongs the read range of the antenna essentially. Thanks to the metallic bottom surface 4, the antenna signal is reflected away from the container. Especially suitable is to have the invention on beverage cans, where the aluminium bottom surface of the can reflects antenna signal.

In the foregoing, the invention has been described on the basis of some specific preferred embodiments. It is appreciated, however, that other embodiments and variants are possible within the scope of the following claims. For example the disclosed antenna has been proven to have the best read range, but the skilled person realises that other shapes and types of the antenna may be possible. For example a spiral or dipole antenna, which is smaller than concave bottom may be used.

The invention claimed is:

1. A substantially cylindrical, metal container comprising:
 an envelope surface wall, a top end, and a bottom end, wherein the bottom end having a cavity which is formed by a circular concave, parabolic bottom surface and a circular surrounding edge, and,
 an Ultra High Frequency (UHF) Radio Frequency Identification (RFID) tag, comprising an integrated circuit and an antenna, arranged at the bottom end, and,
 wherein the antenna is located at a predetermined distance above a center of the circular concave, parabolic bottom surface, such that the circular concave, parabolic bottom surface reflects antenna radiation and thereby prolongs a read range of the antenna.

2. The container according to claim 1, wherein the antenna is a planar folded dipole antenna and has a circular form.

3. The container according to claim 2, wherein an outer diameter of the antenna is close to a diameter of the surrounding edge of the container.

4. The container according to claim 1, wherein the antenna is located in a range 10-16 millimeters above the center of the circular concave, parabolic bottom surface.

5. The container according to claim 1, wherein the RFID tag is attached onto a support layer, and
 wherein the support layer is arranged on a top of the circular surrounding edge, such that the antenna is located in alignment with an upper end of the circular surrounding edge.

6. The container according to claim 5, wherein the support layer is a Polyethylene Terephthalate (PET) film.

7. The container according to claim 2, wherein an outer diameter of the antenna is in the range 36-44 millimeters.

8. The container according to claim 2, wherein the antenna is made of a thin carrier substrate which is covered with a conductive layer.

9. The container according to claim 8, wherein the thin carrier substrate is made from a material selected from a group consisting of: polymer, paper, board, textile, and non-woven material.

10. The container according to claim 8, wherein the conductive layer is made from a material selected from a group consisting of: aluminium, copper, silver, tin, bismuth, and alloys of those.

11. The container according to claim 8, wherein the carrier substrate is an approximately 50 micrometers thick Polyethylene Terephthalate (PET) substrate and the conductive layer is an approximately 10 micrometers aluminium layer.

12. The container according to claim 8, wherein the antenna has a half ring-shaped gap nearby an outer edge of the antenna, in which gap the carrier substrate is uncovered by the conductive layer.

13. The container according to claim 1, wherein the container is made of aluminium.

14. The container according to claim 1, wherein the container is a beverage can.

* * * * *